United States Patent Office 3,577,470
Patented May 4, 1971

3,577,470
PROCESS FOR PREPARING 1,3,5-HALOXYLENE
John D. Bacha, Monroeville, and Charles M. Selwitz, Pitcairn, Pa., assignors to Gulf Research & Development Company, Pittsburgh, Pa.
No Drawing. Filed Dec. 20, 1968, Ser. No. 785,798
Int. Cl. C07c 25/04
U.S. Cl. 260—650   4 Claims

ABSTRACT OF THE DISCLOSURE

A process for isomerizing a haloxylene to a 1,3,5-haloxylene which involves contacting such haloxylene charge with hydrogen fluoride and boron trifluoride, preferably in the presence of ortho-halotoluene.

---

Haloxylenes can exist in six isomeric forms, but of these 1,3,5-haloxylene,

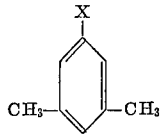

wherein X is halogen, has an appreciable commercial attraction. For example, as shown in U.S. Pat. No. 3,352,927 to De Vries et al., 3,5-xylenol can be used in the preparation of a readily curable extremely attractive formaldehyde-type thermosetting polymer. The 3,5-xylenol required for such polymer can easily be obtained by conventional hydrolysis of 1,3,5-chloroxylene.

We have found haloxylenes that do not fit the definition of 1,3,5-haloxylene can be effectively isomerized to 1,3,5-haloxylene by the mere expedient of contacting the same with HF and $BF_3$, preferably in the presence of an ortho-halotoluene. By "haloxylenes" we intend to include chloro-, bromo-, fluoro- and iodoxylenes, although the procedure is particularly pertinent to the isomerization of chloroxylenes.

The isomerization reaction defined herein is effectively carried out merely by bringing the haloxylene charge (which can include any one or any combination of non-1,3,5-haloxylenes) in effective contact with HF and $BF_3$. Thus, in a preferred embodiment anhydrous HF is added to a closed reactor containing the haloxylene charge, after which $BF_3$ gas is added thereto. The molar ratio of HF to $BF_3$ used in the isomerization reaction can be from about 100:1 to about 1:1, preferably from about 10:1 to about 2:1. The molar ratio of HF and $BF_3$ (as a combined entity) to the haloxylene charge can be from about 300:1 to about 1:1, preferably in the range of about 50:1 to about 5:1. The contents of the reactor are stirred during the course of the reaction, with the temperature being as low as about 25° C. or as high as about 160° C., but preferably remaining in the range of about 55° to about 95° C. Below about 25° C. the reaction rate is too slow, whereas at temperatures in excess of about 160° C. dehalogenation and the formation of decomposition products and polymers is facilitated. Pressure is not critical and can be as low as about 15 pounds per square inch gauge to as high as about 1200 pounds per square inch gauge, or even higher, but preferably is maintained within a range of about 100 to about 800 pounds per square inch gauge. In effect any pressure sufficient to maintain the HF in the liquid phase can be employed. The reaction time is highly dependent upon the other factors discussed herein and can therefore be varied over a wide range, although, in general, a time of about one minute to about five hours, preferably about 15 minutes to about one hour can be used.

At the end of the reaction period stirring is terminated and three phases are found. The lower phase is a liquid containing a mixture of haloxylenes (initial isomers and isomers formed during the process) and dsiproportionation products, such as halotoluenes and halotrimethylbenzenes. The intermediate layer is also a liquid and contains liquid HF having dissolved therein from about 50 to about 90 percent by weight thereof of a complex composed of HF, $BF_3$ and the desired 1,3,5-haloxylene isomer, with the remainder made up of any one or combination of other haloxylene isomers and disproportionation products thereof complexed with HF and $BF_3$. The upper phase is gaseous and under the conditions of the reaction defined herein is composed almost wholly of $BF_3$. The intermediate liquid phase is withdrawn from the reaction zone and the components therein separated by any suitable procedure such as the following. The liquid phase so removed is subjected to distillation under any suitable conditions, for example, a pressure of about five to about 800 pounds per square inch gauge, preferably about 10 to about 300 pounds per square inch gauge, at a temperature of about 0° to about 180° C. The complex is thus broken and gaseous HF and $BF_3$ is removed overhead. The remaining product can then be further purified to remove any disproportionation products and some of the undesired haloxylene isomers thereof, for example, by distillation, and thereby leave behind the desired 1,3,5-haloxylene or a mixture rich in 1,3,5-haloxylene, which can be converted, as noted, by hydrolysis, for example, to 3,5-xylenol.

Although the above procedure is effective to convert, by isomerization, the haloxylene charge to the desired isomer, 1,3,5-haloxylene, there is also a tendency under certain conditions, for example, at elevated temperatures, for disproportionation of the haloxylene to occur, resulting in the production of isomeric halotoluenes and halotrimethyl benzenes. This means the loss of two molecules of the haloxylene charge to undesired compounds, and, to the extent this occurs, production of 1,3,5-haloxylene is thereby reduced. To the extent disproportionation is inhibited, the haloxylenes that are not converted to disproportionation products are thus available for isomerization to desired 1,3,5-xylene. By conducting the isomerization reaction in the added presence of a halotoluene there is about 70 to about 98 percent reduction in the amount of haloxylene converted to disproportionation products over the amount that would be so converted in its absence.

We have found that the undesired disproportion of haloxylene charge can be severely inhibited by conducting the isomerization reactor herein in the additional presence of ortho-halotoluene. By "halotoluene" we mean to include chloro-, bromo-, fluoro- and iodotoluenes, although ortho-chlorotoluene is preferred. When an ortho-halotoluene is also employed herein the halogen on the toluene ring must be identical to the halogen on the haloxylene charge. The molar ratio of halotoluene to haloxylene can be from 0.5:1 to about 10:1, preferably from about 2:1 to about 5:1, but best results are obtained when the molar ratios are about 4:1. The composition of the three phases at the termination of the isomerization reaction, insofar as compounds present are concerned, will not be changed because an ortho-halotoluene has been employed. In the absence of a halotoluene in the charge, a halotoluene will still be present in the reaction mixture because of the defined disproportionation. When a halotoluene is also present in the charge, it will also be present in the product, if not in its initial form it will be present in one of its isomeric forms. As noted previously the halotoluene will be formed primarily in the lower liquid phase.

The process defined herein can further be illustrated by the following. A series of runs was made wherein chlorotoluene and chloroxylene or chloroxylene alone were placed in a 300 milliliter stainless steel autoclave equipped with a stirrer, an internal cooling coil and an external heating mantle. After cooling to less than 0° C., anhydrous HF was condensed into the reactor and $BF_3$ was pressured therein. Heat was applied to the stirred reactor until the indicated temperature was reached and that temperature was maintained for the indicated time. The pressure that developed within the reactor at the indicated temperature is recorded. The reactor was then cooled to less than 0° C. and the product withdrawn by way of a bottom drain onto cracked ice in a polyethylene vessel. The resulting aqueous HF, chloroaromatic mixture was extracted at least twice with aliquots of light hydrocarbon (hexane), the extracts combined and washed free of acid with water, two percent aqueous sodium bicarbonate and water again and finally dried over sodium sulfate. This hydrocarbon solution of chloroaromatic products was analyzed by gas chromatography employing an 80' x 1/8" stainless steel column packed with 15 percent p-azoxyanisole on acid washed, 30/60 mesh chromosorb W and a 10' x 1/8" stainless steel column packed with 20 percent FFAP on acid washed, DMCS treated, 70/80 mesh chromosorb W, both operated at 120° C. The results obtained are tabulated below in Tables I and II.

TABLE I

| Run No. | Charge (mol) CX[1] | CT | HF | $BF_3$ | Molar ratios CT/CX | HF/CX | $BF_3$/CX | Temp., °C. | Pressure, p.s.i. | Time, Hours | Product distribution, mol percent CB | CX | CT[5] | CTMB[3] | CX lost to disproportionation, mol percent | CX isomer distribution, mol percent 1,2,6- | 1,2,5- | 1,2,4- | 1,3,5- | 1,2,3- | 1,3,4- |
|---|---|---|---|---|---|---|---|---|---|---|---|---|---|---|---|---|---|---|---|---|---|
| 1 | 0.0854 | [2]0.343 | 2.66 | 0.522 | 4.02 | 31.2 | 6.10 | 85 | 580 | 1.0 | 2.2 | 19.6 | 75.0 | 1.6 | 1.6 | 11.7 | 29.6 | 25.7 | 21.8 | 4.9 | 6.3 |
| 2 | 0.0712 | [3]0.286 | 2.19 | 0.488 | 4.02 | 30.7 | 6.85 | 85 | 560 | 1.0 | 0.9 | 17.0 | 80.7 | 0.7 | 7.6 | 12.9 | 32.2 | 25.6 | 17.9 | 5.3 | 6.1 |
| 3 | 0.0712 | [4]0.286 | 2.27 | 0.476 | 4.02 | 31.9 | 6.70 | 85 | 580 | 1.0 | 0.4 | 18.5 | 80.9 | 0.1 | 1.2 | 13.0 | 30.2 | 26.3 | 19.9 | 5.2 | 6.4 |
| 4 | 0.0854 | [5]0.343 | 2.68 | 0.507 | 4.02 | 31.4 | 6.94 | 85 | 580 | 1.0 | 0.1 | 17.3 | 80.9 | 0.12 | 1.2 | 12.7 | 30.3 | 26.2 | 20.4 | 5.2 | 5.3 |
| 5 | 0.0854 | [6]0.347 | 2.57 | 0.550 | 4.06 | 30.1 | 6.40 | 85 | 640 | 1.0 | 0.1 | 18.9 | 82.4 | 0.1 | 4.1 | 10.4 | 35.8 | 21.1 | 24.8 | 4.2 | 4.1 |
| 6 | 0.0854 | [7]0.173 | 2.73 | 0.554 | 2.03 | 32.0 | 6.50 | 85 | 600 | 2.0 | 79.0 | 18.5 | 0 | 0.05 | 4.1 | 10.4 | 18.5 | 16.3 | 20.4 | 3.5 | 5.3 |
| 7 | 0.0896 | 0 | 2.57 | 0.260 | 0 | 28.7 | 2.90 | 65 | 600 | 2.0 | 66.4 | 24.8 | 0 | 2.3 | 24.0 | 6.4 | 35.8 | 15.7 | 24.8 | 3.5 | 4.7 |
| 8 | 0.0896 | [5]0.160 | 2.56 | 0.260 | 1.78 | 28.5 | 3.40 | 85 | 330 | 2.0 | 0.1 | 48.0 | 66.8 | 2.3 | 52.0 | 14.2 | 33.1 | 25.7 | 21.9 | 3.5 | 4.1 |
| 9 | 0.0896 | [5]0.160 | 2.61 | 0.285 | 1.78 | 29.1 | 3.18 | 85 | 330 | 2.0 | 0.5 | 32.3 | 66.7 | 2.1 | 52.0 | 14.2 | 41.2 | 25.4 | 25.4 | 4.7 | 2.7 |
| 10 | 0.0853 | [5]0.172 | 2.65 | 0.525 | 2.01 | 31.0 | 6.15 | 85 | 580 | 2.0 | 1.4 | 28.7 | 66.4 | 2.1 | 13.8 | 10.9 | 26.9 | 25.4 | 25.4 | 5.2 | 6.2 |
| 11 | 0.0854 | [5]0.343 | 2.61 | 0.567 | 4.02 | 30.5 | 6.65 | 85 | 610 | 2.0 | 0.3 | 18.1 | 81.0 | 0.3 | 16.7 | 9.5 | 23.2 | 21.9 | 35.9 | 4.0 | 5.5 |
| | | | | | | | | | | | | | | | | 11.2 | 27.3 | 25.5 | 25.4 | 4.8 | 5.8 |

[1] Chloro-p-xylene (1,2,5-CX). [2] p-Chlorotoluene. [3] m-Chlorotoluene. [4] Chlorotoluene mixture, molar ratio: o/m/p:63/30/7. [5] o-Chlorotoluene. [6] Chlorobenzene (CB). [7] CB/CT. [8] Chlorotoluene from charge. [9] Chlorotoluene or chlorotrimethylbenzene formed from disproportionation.

TABLE II

| Run No. | Charge (mol) CX | CT[1] | HF | $BF_3$ | Molar ratios CT/CX | HF/CX | $BF_3$/CX | Temp., °C. | Pressure, p.s.i. | Time, hours | Product distribution, mol percent CB | CX | CT[2] | CTMB[3] | CX lost to disproportionation, mol percent | CX isomer distribution, mol percent 1,2,6- | 1,2,5- | 1,2,4- | 1,3,5- | 1,2,3- | 1,3,4- |
|---|---|---|---|---|---|---|---|---|---|---|---|---|---|---|---|---|---|---|---|---|---|
| 12 | 0.0576 | 0.237 | 1.72 | 0.344 | 4.11 | 30.0 | 5.97 | 85 | 560 | 1.0 | 1.0 | 18.5 | 80.1 | 0.2 | 2.1 | 10.5 | 26.5 | 24.0 | 25.6 | 5.5 | 7.9 |
| 13 | 0.0612 | 0.235 | 1.88 | 0.374 | 3.84 | 30.7 | 6.12 | 85 | 600 | 2.0 | 1.9 | 20.9 | 75.8 | 0.7 | 0.7 | 9.6 | 25.2 | 23.0 | 26.6 | 5.7 | 9.9 |
| 14 | 0.0570 | 0.237 | 1.92 | 0.384 | 4.16 | 33.7 | 6.74 | 65 | 510 | 2.0 | 0.5 | 18.5 | 80.0 | 0.5 | 5.1 | 10.9 | 26.4 | 24.0 | 27.5 | 5.1 | 6.1 |
| 15 | 0.0570 | 0.238 | 2.77 | 0.435 | 4.17 | 48.6 | 7.63 | 65 | 480 | 2.0 | 0.4 | 20.4 | 79.7 | 0.7 | 5.0 | 10.9 | 26.4 | 23.7 | 34.3 | 4.9 | 5.8 |
| 16 | 0.0292 | 0.115 | 2.77 | 0.432 | 3.92 | 98.3 | 20.9 | 65 | 500 | 2.0 | 1.1 | 20.4 | 76.3 | 0.7 | 7.0 | 5.7 | 35.8 | 21.8 | 34.3 | 3.1 | 4.7 |
| 17 | 0.0284 | 0.118 | 2.93 | 0.534 | 4.15 | 103.2 | 20.9 | 65 | 600 | 2.0 | 1.4 | 19.7 | 78.3 | 0.7 | 6.4 | 4.8 | 15.0 | 13.4 | 58.1 | 3.1 | 3.2 |
| 18 | 0.0150 | 0.0597 | 3.05 | 0.594 | 4.00 | 203.0 | 35.6 | 65 | 650 | 2.0 | 2.5 | 24.9 | 69.1 | 0.7 | 6.4 | 2.5 | 13.5 | 11.2 | 65.1 | 2.2 | 3.2 |
| 19 | 0.0150 | 0.0597 | 3.15 | 0.466 | 4.00 | 210.0 | 31.1 | 65 | 650 | 2.0 | 4.3 | 32.1 | 63.7 | 0.4 | 8.3 | 3.1 | 8.3 | 6.8 | 81.6 | 1.2 | 1.9 |
| 20 | 0.0150 | 0.0597 | 3.18 | 0.420 | 4.00 | 212.0 | 28.0 | 65 | 410 | 2.0 | 8.4 | 24.1 | 63.7 | 1.9 | 13.6 | 7.7 | 8.9 | 14.0 | 78.1 | 2.0 | 2.0 |
| 21 | 0.0150 | 0.0697 | 3.04 | 0.174 | 4.00 | 203.0 | 11.0 | 65 | 190 | 2.0 | 0.8 | 19.4 | 79.2 | 0.3 | 3.0 | 11.9 | 18.2 | 22.4 | 55.3 | 2.8 | 4.0 |
| | | | | | | | | | | | | | | | | | 28.2 | | 28.3 | 4.9 | 4.3 |

[1] Ortho-chlorotoluene. [2] Chlorotoluene charged. [3] Chlorotoluene or chlorotrimethylbenzene from disproportionation.

The data in the above tables clearly illustrate the advantages of operation in accordance with the defined procedure. As seen in Runs Nos. 1 to 4, ortho-chlorotoluene itself or a mixture rich in ortho-chlorotoluene is effective in controlling disproportionation of chloroxylene whereas para- or meta-chlorotoluene are not as effective for such purpose. Similarly Runs Nos. 5 and 6 show that chlorobenzene does not possess the same ability in this respect as shown by ortho-chlorotoluene. The tables also show that chloroxylene loss to disproportionation is equal to the sum of chlorotoluene and chlorotrimethylbenzene fromed from disproportionation divided by the same sum plus the chloroxylene left in the product $$(CT^9 + CTMB^9 / CT^9 + CTMB^9 + CX)$$

The effect of increasing amounts of ortho-chlorotoluene on isomerization and disproportionation in parallel sets of experiments is demonstrated at 65° and 85° C. in Runs Nos. 7 to 11. The effect of time on isomerization and disproportionation is revealed by comparison of Runs 4 and 11. The influence of large changes in HF and/or $BF_3$ proportions at 65° or 85° C. on the over-all distribution of chloroxylenes, especially 1,3,5-chloroxylene, is described in Runs 12 to 21.

Obviously many modifications and variations of the invention, as hereinabove set forth, can be made without departing from the spirit and scope thereof, and therefore only such limitations should be imposed as are indicated in the appended claims.

We claim:

1. A process for isomerizing a monohaloxylene charge, other than a 1,3,5-monohaloxylene, to 1,3,5-monohaloxylene which comprises contacting such charge with anhydrous liquid HF, $BF_3$ and an orthohalotoluene, the halogen on the haloxylene charge and on the halotoluene being identical to each other, said contact being made at a temperature of about 55° to about 160° C. and a pressure of about 15 pounds to about 1200 pounds per square inch gauge, the molar ratio of HF to $BF_3$ being from about 100:1 to about 1:1, the molar ratio of combined HF and $BF_3$ to the haloxylene charge being from about 300:1 to about 1:1 and the molar ratio of halotoluene to haloxylene being from about 0.5:1 to about 10:1.

2. The process of claim 1 wherein said monohaloxylene charge is a monochloroxylene and said orthohalotoluene is orthochlorotoluene.

3. The process of claim 1 wherein said monohaloxylene charge is chloro-p-xylene and said orthohalotoluene is orthochlorotoluene.

4. The process of claim 1 wherein the temperature is about 55° to 95° C., the pressure about 100 to about 800 pounds per square inch gauge, the molar ratio of HF to $BF_3$ is about 10:1 to about 2:1, the molar ratio of combined HF and $BF_3$ to the haloxylene charge is about 50:1 to about 5:1, and the molar ratio of halotoluene to haloxylene is about 2:1 to about 5:1.

References Cited

UNITED STATES PATENTS 2,881,224    4/1959    McCaulay et al. _____ 260—650

OTHER REFERENCES

McCaulay et al., J. Am. Chem. Soc. 74 (1952) pp. 6246–6250; copy in library.

Olah, Friedel-Crafts and Related Reactions, vol. 11, part 2, Interscience Publishers, New York, pp. 1062–1071; copy in library.

HOWARD T. MARS, Primary Examiner

PO-1050
(5/69)

UNITED STATES PATENT OFFICE
CERTIFICATE OF CORRECTION

Patent No. 3,577,470                     Dated    May 4, 1971

Inventor(s)    John D. Bacha and Charles M. Selwitz

It is certified that error appears in the above-identified patent and that said Letters Patent are hereby corrected as shown below:

Table I, Run No. 6, "CT" column under "Charge", "$7_{0.173}$" should read "$6_{0.173}$".

Signed and sealed this 3rd day of August 1971.

(SEAL)
Attest:

EDWARD M. FLETCHER, JR.                WILLIAM E. SCHUYLER, JR.
Attesting Officer                       Commissioner of Patents